(12) United States Patent
Gregg (10) Patent No.: US 7,147,338 B2
(45) Date of Patent: Dec. 12, 2006

(54) CIRCUIT ON A CURVED, OR OTHERWISE IRREGULARLY SHAPED, SURFACE, SUCH AS ON A HELMET TO BE WORN ON THE HEAD, INCLUDING A FIBER OPTIC CONDUCTIVE PATH

(76) Inventor: Kent Gregg, 1208 Gilbert Ct., Iowa City, IA (US) 52240

( * ) Notice: Subject to any disclaimer, the term of this patent is extended or adjusted under 35 U.S.C. 154(b) by 0 days.

(21) Appl. No.: 09/828,239

(22) Filed: Apr. 9, 2001

(65) Prior Publication Data

US 2002/0145865 A1 Oct. 10, 2002

(51) Int. Cl.
*F21V 33/00* (2006.01)
(52) U.S. Cl. .................. 362/106; 362/184; 362/234
(58) Field of Classification Search ............... 362/554, 362/570, 105, 106, 184, 234, 253; 340/468, 340/473, 475, 478, 432
See application file for complete search history.

(56) References Cited

U.S. PATENT DOCUMENTS

| | | | |
|---|---|---|---|
| 2,705,751 A | 4/1955 | Harris et al. ................... 240/60 |
| 3,790,744 A | 2/1974 | Bowen ........................ 219/121 |
| 4,231,079 A | 10/1980 | Heminover ................. 362/106 |
| 4,500,182 A | 2/1985 | Schumann ..................... 354/4 |
| 4,559,516 A | 12/1985 | Schott et al. .................. 340/73 |
| 4,761,056 A | 8/1988 | Evans et al. ................. 350/174 |
| 4,817,426 A | 4/1989 | Igenbergs et al. ............. 73/180 |
| 4,862,331 A | 8/1989 | Hanabusa ................... 362/106 |
| 4,874,955 A | 10/1989 | Uesugi et al. ............... 250/550 |
| 4,901,210 A | 2/1990 | Hanabusa ................... 362/106 |
| 4,901,211 A | 2/1990 | Shen .......................... 362/106 |
| 4,908,782 A | 3/1990 | Pekarek et al. ............. 364/560 |
| 4,920,385 A | 4/1990 | Clarke et al. ............... 356/237 |
| 4,925,301 A | 5/1990 | Rafanelli ..................... 356/124 |
| 4,933,205 A | 6/1990 | Duley et al. ................ 427/53.1 |
| 4,949,024 A | 8/1990 | Matsuura ..................... 318/567 |
| 4,956,752 A | 9/1990 | Foglietti ....................... 362/72 |
| 4,969,110 A | 11/1990 | Little et al. ................. 364/550 |
| 5,040,099 A | 8/1991 | Harris ......................... 362/72 |
| 5,041,988 A | 8/1991 | Suzuki et al. ............... 364/506 |
| 5,102,223 A | 4/1992 | Uesugi et al. .............. 356/376 |
| 5,111,366 A | 5/1992 | Rife et al. ..................... 362/31 |
| 5,128,794 A | 7/1992 | Mocker et al. ............. 359/196 |
| 5,138,368 A | 8/1992 | Kahn et al. ................... 355/53 |
| 5,187,540 A | 2/1993 | Morrison .................... 356/152 |
| 5,207,500 A | 5/1993 | Rios et al. .................. 362/105 |
| 5,208,641 A | 5/1993 | Mocker et al. ................ 356/5 |
| 5,218,427 A | 6/1993 | Koch ......................... 356/376 |
| 5,257,204 A | 10/1993 | Sawada et al. ......... 364/474.24 |
| 5,314,249 A | 5/1994 | Marui et al. ................ 374/128 |

(Continued)

*Primary Examiner*—Thomas M. Sember
(74) *Attorney, Agent, or Firm*—Brian J. Laurenzo; Jason M. Hunt (57) ABSTRACT

A curved surface, such as a helmet, including a light source and light conductive paths. Light emitting diodes (LEDs) provide the light source and fiber optic conductors provide the light conductive paths. The fiber optic conductors have polished ends to create lenses. A microprocessor or other logic, powered by a battery, can control the LEDs, possibly of different colors, to generate various colors or patterns for display. The components, including the microprocessor, battery, and light source, can be contained with a breakaway compartment in the helmet. The battery can include light rechargeable batteries positioned in the top of the helmet shell. The fiber optic conductors can be attached to or molded into the helmet shell so that the light traveling through them is visible and creates particular light patterns for display or is fully focused to the ends.

16 Claims, 12 Drawing Sheets

U.S. PATENT DOCUMENTS

| | | | |
|---|---|---|---|
| 5,327,351 A | 7/1994 | Matsuura et al. | 364/474.05 |
| 5,328,811 A | 7/1994 | Brestel | 430/325 |
| 5,341,242 A | 8/1994 | Gilboa et al. | 359/631 |
| 5,353,008 A | 10/1994 | Eikenberry et al. | 340/479 |
| 5,357,409 A * | 10/1994 | Glatt | 362/105 |
| 5,377,011 A | 12/1994 | Koch | 356/376 |
| 5,396,331 A | 3/1995 | Kitoh et al. | 356/376 |
| 5,402,364 A | 3/1995 | Kitoh et al. | 364/560 |
| 5,416,876 A | 5/1995 | Ansley et al. | 385/116 |
| 5,442,573 A | 8/1995 | Bredberg et al. | 364/563 |
| 5,508,900 A | 4/1996 | Norman | 362/106 |
| 5,535,105 A * | 7/1996 | Koenen et al. | 362/570 |
| 5,544,027 A * | 8/1996 | Orsano | 362/105 |
| 5,559,680 A | 9/1996 | Tabanera | 362/106 |
| 5,575,554 A * | 11/1996 | Guritz | 362/103 |
| 5,580,466 A | 12/1996 | Tada et al. | 216/3 |
| 5,588,736 A * | 12/1996 | Shea, Sr. | 362/106 |
| 5,621,922 A * | 4/1997 | Rush, III | 2/422 |
| 5,627,771 A | 5/1997 | Makino | 364/560 |
| 5,635,976 A | 6/1997 | Thuren et al. | 347/253 |
| 5,663,885 A | 9/1997 | Stahl | 364/470.05 |
| 5,674,414 A | 10/1997 | Schweizer | 219/121.77 |
| 5,674,595 A * | 10/1997 | Busacco et al. | 428/209 |
| 5,758,947 A * | 6/1998 | Glatt | 362/105 |
| 5,871,271 A * | 2/1999 | Chien | 362/106 |
| 5,931,559 A * | 8/1999 | Pfaeffle | 362/106 |
| 5,962,192 A | 10/1999 | Holman, III et al. | 430/302 |
| 6,004,734 A | 12/1999 | Berg | 430/502 |
| 6,007,213 A * | 12/1999 | Baumgartner | 362/106 |
| 6,008,468 A | 12/1999 | Tanaka et al. | 219/121.71 |
| 6,037,085 A | 3/2000 | Holman, III et al. | 430/18 |

* cited by examiner

CIRCUIT ON A CURVED, OR OTHERWISE IRREGULARLY SHAPED, SURFACE, SUCH AS ON A HELMET TO BE WORN ON THE HEAD, INCLUDING A FIBER OPTIC CONDUCTIVE PATH

REFERENCE TO RELATED APPLICATIONS

The present application is related to the following applications, all of which are incorporated herein by reference as if fully set forth: U.S. patent application Ser. No. 08/651,964, entitled "Circuit on a Curved, or Otherwise Irregularly Shaped, Surface, Such as on a Helmet to be Worn on the Head, Including a Conductive Path Integral with the Surface," and filed May 21, 1996; and U.S. patent application Ser. No. 09/828,240, entitled "Method and Apparatus of Using Robotics or a Three-Dimensional Laser Beam to Expose a Path on a Curved or Otherwise Irregularly Shaped Surface," and filed on Apr. 9, 2001.

BACKGROUND OF THE INVENTION

The invention relates to a circuit on a curved surface, such as on a helmet, and to a method of forming a portion of the circuit, and more particularly, to a circuit on a curved surface including at least one conductive path integral with the curved surface, and to a method of forming a conductive path on, and integral with, a curved surface.

Presently, circuits are provided only on flat surfaces. This is due to the fact that it has been very difficult to trace and form conductive paths on curved surfaces. Therefore, circuits on curved surfaces typically include a flat circuit board in close proximity to the curved surface. Circuit elements such as light emitting diodes are generally mounted on the curved surface, and the flat circuit board is wired to the circuit elements. Additionally, a battery is typically provided near, and is wired to, the flat circuit board. Wiring from the battery to the flat circuit board, and from the flat circuit board to the circuit elements, enables the flat circuit board to power and operate the circuit elements in a pattern dictated by the circuitry on the flat circuit board.

While these circuits do provide curved surfaces with circuit elements thereon, these circuits are inadequate in many respects. For example, because the circuitry is on a flat circuit board which is not integral with the curved surface, it is necessary to handle the curved surface gently so that the wiring does not disconnect from the circuit elements, the flat circuit board, or the battery. If the curved surface is, in fact, a helmet, such as is shown in U.S. Pat. No. 4,231,079, it is necessary to gently place the helmet over the head and gently remove the helmet from the head in order to prevent the wiring from disconnecting. Furthermore, if the helmet is worn while riding a bicycle, it is possible for the vibrations from the bicycle to cause the wiring to disconnect from the circuit elements, the flat circuit board, or the battery. Of course, if the wiring disconnects, this typically results in a circuit which fails to function properly.

Moreover, these circuits make it necessary to provide or reserve space for the flat circuit board, the battery, and the wiring. For example, if the curved surface is a helmet as shown in U.S. Pat. No. 4,231,079, it is necessary to reserve space within the helmet to accommodate the flat circuit board, the battery, and the wiring therebetween. Therefore, the helmet cannot be designed to precisely fit the head, but instead must be oversized. Not only does oversizing the helmet result in a waste of material, but not designing the helmet to precisely fit the head may result in a helmet which is less effective at protecting the head. Furthermore, the flat circuit board, battery, and wiring within the helmet can injure the wearer of the helmet if the helmet is subjected to impact such as if the helmet is worn while riding a bicycle or motorcycle. Also, the presence of the flat circuit board, battery, and wiring therebetween within the helmet results in the helmet being uncomfortable to the wearer.

The difficulties encountered in the related art hereinabove are substantially eliminated by the present invention.

SUMMARY OF THE INVENTION

A circuit on a curved or irregular surface, such as on a helmet, consistent with the present invention includes at least one light source and at least one light conductive path attached to the curved or irregular surface, or the exterior surface of the helmet. The light conductive path, such as a fiber optic conductors has a first end optically coupled to the light source and a second end for emitting light.

A light system on a helmet consistent with the present invention includes a shell and a plurality of fiber optic conductors attached to the shell. The fiber optic conductors each have a first end optically coupled to a light source and a second end for emitting light. Logic circuitry is coupled to the light source and a power source for controlling operation of the light source, and the light source, the battery, and the logic are all located on the shell.

DESCRIPTION OF THE DRAWINGS

The accompanying drawings are incorporated in and constitute a part of this specification and, together with the description, explain the advantages and principles of the invention. In the drawings.

DETAILED DESCRIPTION OF THE INVENTION

Figure 1:
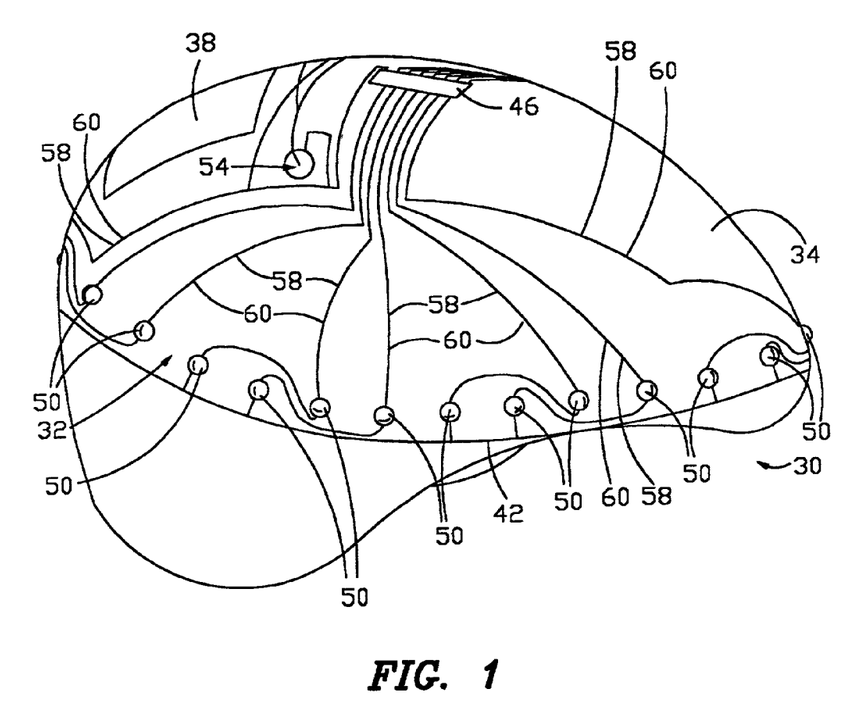
FIG. 1 is a perspective view of a helmet in accordance with the present invention.
Figure 2:
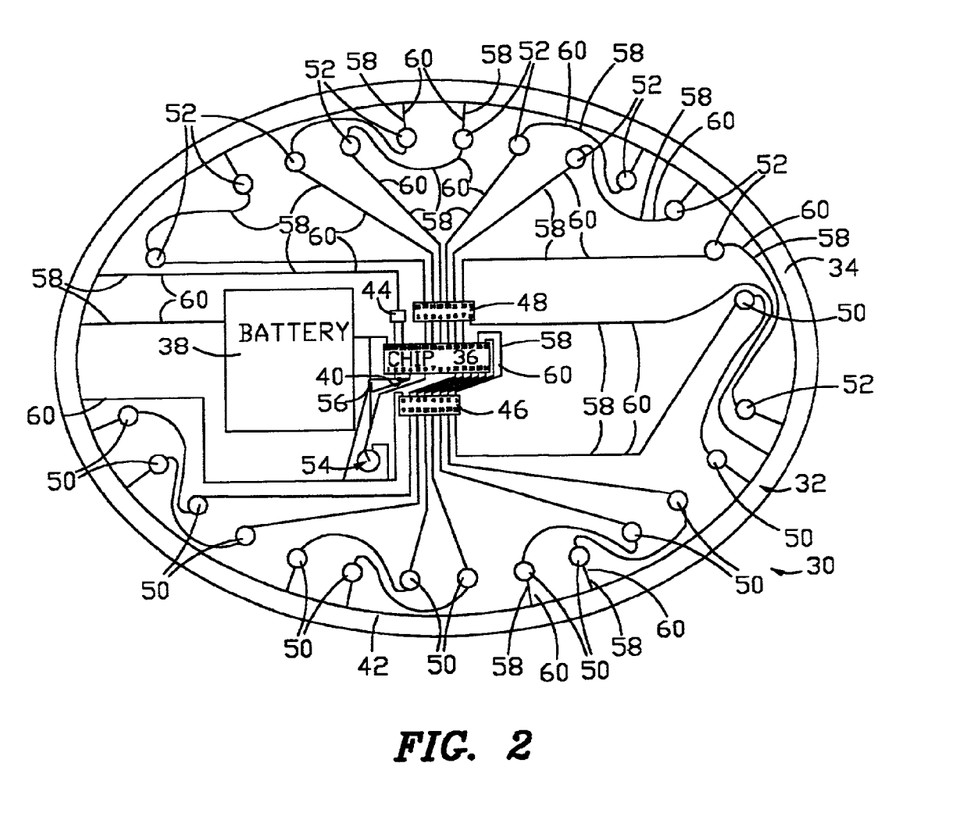
FIG. 2 is a top view of the helmet shown in FIG. 1.

Shown in the figures is a helmet 30 to be worn on the head of a person riding a bicycle or motorcycle (not shown). As shown in FIGS. 1 and 2, the helmet 30 has an electric circuit 32 on the exterior surface 34 of the helmet 30. The electric circuit 32 includes a microprocessing chip 36 which may be chip #PTC16C55 commercially available from Microchip Technology, Inc. at 2355 W. Chandler Blvd. in Chandler, Ariz. 85224-6199. The microprocessing chip 36 is powered by a battery 38 which is connected to the microprocessing chip 36 at pin connections 2, 4 and 28 of the microprocessing chip 36 as shown in FIG. 2. As shown, a capacitor 40 is connected to pin connection 2 and pin connection 4 of the microprocessing chip 36. The capacitor 40 shown in FIG. 2 is a sixteen volt capacitor having a capacitance of 10 microfarrad. The battery 38 supplies 4.8 to 5.8 volts of direct current and is connected to a grounding loop 42 which is merely a conductive path around the helmet 30. Also, the microprocessing chip 36 is connected to a resonator 44 at pin connections 26 and 27, and the resonator 44 is connected to the grounding loop 42. Pin connections 10–16 of the microprocessing chip 36 are connected to pin connections 1–7 of a first driver chip 46, and pin connections 18–23 of the microprocessing chip 36 are connected to pin connections 2–7 of a second driver chip #TPIC27O1 commercially available from Texas Instruments, Inc. at 8505 Forest Lane in Dallas, Tex. 75243.

One pair of amber light emitting diodes 50 in series is connected to each of pin connections 10–16 of the first driver chip 46. Each pair of amber light emitting diodes 50 is also connected to the grounding loop 42 as shown in FIG. 2. Likewise, one pair of red light emitting diodes 52 in series is connected to each of pin connections 10–15 of the second driver chip 48. Each pair of red light emitting diodes 52 is also connected the grounding loop 42. Therefore, there are seven pairs of amber light emitting diodes 50 and six pairs of red light emitting diodes 52. The first driver chip 46 is connected to the grounding loop 42 at pin connection 8. Similarly, the second driver chip 48 is also connected to the grounding loop 42 at pin connection 8.

As shown in FIG. 2, pin connection 6 of the microprocessing chip 36 may be connected to means for receiving a signal 54. As mentioned, the helmet 30 shown in the figures is meant to be worn by a person when riding a bicycle or motorcycle, and therefore the means for receiving a signal 54 may be means for receiving a wireless radio frequency, ultrasonic or infrared signal, any of which are transmitted by another device (not shown) as a result of a brake or a turn signal on the bicycle or motorcycle (not shown) being applied or in response to other input. Depending on the type of means for receiving a signal 54 which is, in fact, utilized, it may be appropriate to provide a resistor connected to the means for receiving a signal 54. For example, a resistor 56 is shown in FIG. 2, and the resistor 56 has a resistance of 10 k Ohms. One skilled in the art should appreciate that the appropriate strength of the resistor will vary depending on the exact circuitry which is utilized as the means for receiving a signal 54. The circuitry may also include, in addition to or as an alternative to the means for receiving a signal 54, a power switch for turning the microprocessor, and hence the lights, on and off.

One skilled in the art should also realize that the helmet 30 shown in the figures may, instead of being designed for a bicycle or motorcycle rider, be specifically designed for other applications in which the wearing of a safety head covering would be desirable.

As shown in FIG. 2, all the connections, as described above, between the battery 38, microprocessing chip 36, first driver chip 46, second driver chip 48, light emitting diodes 50 and 52, resonator 44, capacitor 40, resistor 56, grounding loop 42 and means for receiving a signal 54 are conductive paths 58 on the exterior surface 34 of the helmet 30. The conductive paths 58 preferably comprise copper, but may be of any material which is effectively conductive. Preferably, there is a protective overcoat 60 over the conductive paths 58 so that the conductive paths 58 are not subject to the elements of nature and therefore, the helmet 30 can be worn outdoors notwithstanding the fact that it may be raining.

In operation, the helmet 30 is worn on the head while riding a bicycle or motorcycle (not shown), and the electric circuit 32 on the exterior surface 34 of the helmet 30 functions as described below. The battery 38 supplies 4.8 to 5.8 volts along conductive paths 58 on the exterior surface 34 of the helmet 30 to pin connections 2, 4 and 28 of the microprocessing chip 36. The microprocessing chip 36 is programmed to send signals from pin connections 10–16, along conductive paths 58 on the exterior surface 34 of the helmet 30, to pin connections 1–7 of the first driver chip 46. The first driver chip 46 responds by sending signals from pin connections 10–16, along conductive paths 58 on the exterior surface 34 of the helmet 30, to the amber light emitting diodes 50 thus causing each pair of amber light emitting diodes 50 to emit light sequentially one pair at a time.

When the means for receiving a signal 54 is, in fact, receiving a signal, the means for receiving a signal 54 sends a signal along a conductive path 58 on the exterior surface 34 of the helmet 30 to pin connection 6 of the microprocessing chip 36. The microprocessing chip 36 then stops sending signals from pin connections 10–16, along conductive paths 58 on the exterior surface 34 of the helmet 30, to pin connections 1–7 of the first driver chip 46, and instead begins sending signals from pin connections 18–23, along conductive paths 58 on the exterior surface 34 of the helmet 30, to pin connections 2–7 of the second driver chip 48. The second driver chip 48 responds by sending signals from pin connections 10–15, along conductive paths 56 on the exterior surface 34 of the helmet 30, to the red light emitting diodes 52 causing each pair of red light emitting diodes 52 to emit light sequentially one pair at a time.

When the means for receiving a signal 54 no longer is receiving a signal, the means for receiving a signal 54 stops sending a signal along a conductive path 58 on the exterior surface 34 of the helmet 30 to pin connection 6 of the microprocessing chip 36, and the microprocessing chip 36 stops sending signals from pin connections 18–23, along conductive paths 58 on the exterior surface 34 of the helmet 30, to pin connections 2–7 of the second driver chip 48, and instead sends signals from pin connections 10–16, along conductive paths 58 on the exterior surface 34 of the helmet 30, to pin connections 1–7 of the first driver chip 46. In much the same manner as before the means for receiving a signal 54 was, in fact, receiving a signal, the first driver chip 46 sends signals from pin connections 10–16, along conductive paths 58 on the exterior surface 34 of the helmet 30, to the amber light emitting diodes 50 thus causing each pair of amber light emitting diodes 50 to emit light sequentially one pair at a time. In this manner, the amber light emitting diodes 50 light sequentially one pair at a time when the means for receiving a signal 54 is not receiving a signal, and the red light emitting diodes 52 light sequentially one pair at a time when the means for receiving a signal 54 is, in fact, receiving a signal. In addition, the amber and red light emitting diodes can be configured to fire alternately.

While a preferred embodiment of the present invention is described hereinabove, alternative embodiments are anticipated. Other alternatives exist, of course, which are not described herein. As mentioned, within a preferred embodiment as shown in FIG. 2, the microprocessing chip 36 is programmed such that only one pair of light emitting diodes 50 or 52 in series is lit at any given time. By lighting only two light emitting diodes 50 or 52 at any one time, battery 38 life is maximized, and the light emitted from the light emitting diodes 50 or 52 can be seen from a distance of, for example, over 300 feet from the helmet 30. The light emitted is dramatically brighter than would be emitted if all the light emitting diodes 50 and 52 on the helmet 30 were to emit light simultaneously. However, it is possible to provide that a greater or lesser number than a pair of light emitting diodes 50 or 52 are lit at any given time. It is also possible to provide other lights on the helmet 30 which serve other functions than the light emitting diodes 50 and 52 as described above. For example, it is possible to provide the helmet 30 with a switchable, aimable forward facing light for map reading, repair, or other purpose (not shown). The map light, or other light, may be multiplexed as well.

While FIG. 2 shows the light emitting diodes 50 and 52 positioned in a straight line 360 degrees around the helmet 30 so that at least one light emitting diode 50 or 52 is visible no matter from what angle the helmet is viewed, it is possible to provide the light emitting diodes 50 and 52 in other positions. For example, it is possible to position the red light emitting diodes 52 on the helmet 30 in a "U" shape, and position the amber light emitting diodes 50 in an upside-down "U" shape.

Also, the microprocessing chip 36 can be programmed such that all the red light emitting diodes 52 light at the same time when the means for receiving a signal 54 is receiving a signal such as that the brake on a bicycle or motorcycle is being applied (not shown), and that all the amber light emitting diodes 52 light at the same time when the means for receiving a signal 54 is not receiving this signal. There are, of course, other positions and sequences of lighting the light emitting diodes 50 and 52 on the helmet 30 which can be utilized in order to maximize the safety of the wearer of the helmet 30, to maximize the aesthetic appearance of the helmet 30, or to achieve any other function which the helmet 30 is directed to achieve, such as if the helmet 30 is designed to be worn by a person while working on a roadway, at a construction site, in a factory, or other location. It is, of course, also possible to provide a greater or lesser number of light emitting diodes 50 and 52 on the helmet than is described within a preferred embodiment, or to provide different circuit elements within the electric circuit 32 on the helmet 30. One skilled in the art should realize that by using a microprocessing chip 36, there are endless alternatives to programming lighting sequences of the light emitting diodes 50 and 52. For example, it is possible to incorporate a selection switch (not shown) on the helmet 30 which would allow the wearer of the helmet 30 to select between many different lighting patterns and sequences.

Also, it is possible to entirely omit the means for receiving a signal 54 from the electric circuit 32. Or, it is possible to provide that the means for receiving a signal 54 is means for receiving a signal which is transmitted by another device as a result of the occurrence of some other event other than the actuation of a brake or turn signal on a bicycle or motorcycle. For example, a signal may be transmitted and then received by the means for receiving a signal 54 as a result of impending danger having been detected. Or, it is possible that the helmet 30 (or any other article of apparel having conductive paths thereon as described herein with relation to the helmet 30) be designed to be worn by a child who is carrying a toy gun (not shown). When a trigger on the toy gun is actuated by the child, a signal to that effect is transmitted by the gun, and this signal is received by the means for receiving a signal 54 which is on the helmet 30. Consequently, the microprocessing chip 36 causes the light emitting diodes 50 and 52 to emit light in a distinctive pattern in much the same manner as described above.

Additionally, it is possible to provide the electric circuit 32 on some curved surface other than on a helmet 30. For example, it is possible to provide the electric circuit 32 on in-line skates, shoes, bicycle accessories, running clothes, or any other articles of apparel such as a vest (not shown). It is, of course, also possible to provide the electric circuit 32 on a curved surface which is actually planar piecewise. In fact, it is anticipated that the electric circuit 32 can be provided on virtually any irregular surface.

In manufacturing the helmet 30 described above, it is possible to utilize the following method for exposing paths on a curved surface in combination with other industry-known methods. Of course, the following can be utilized to expose paths on a curved surface which is actually planar piecewise, or to expose paths on virtually any irregular surface. One industry-known method is a method presently marketed by Amp-Akzo of 710 Dawson Drive, Newark, Del. 19713. The Amp-Akzo method is a positive, or additive process, of laying conductive paths on a flat surface. Pursuant to the Amp-Akzo method, typically the flat surface is subjected to a seed chemical bath whereby the seed chemical is deposited onto the flat surface, a photosensitive material is placed over the seed chemical, paths are exposed onto the photosensitive material, and then the paths are subjected to a series of electroless baths whereby a conductive material is placed along the exposed paths. While the Amp-Akzo method is effective at providing conductive paths on a flat surface, the method is not effective with curved surfaces due to the difficulty in exposing paths on a curved surface. However, as described below, the Amp-Akzo method may be used in combination with the herein described methods of exposing paths on a curved surface.

Figure 3:
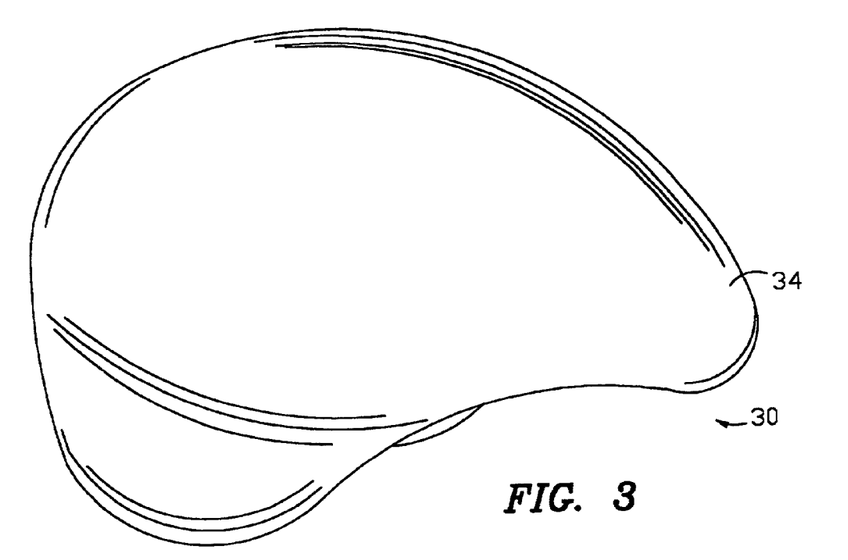
FIG. 3 is a perspective view of a helmet in accordance with the present invention.
Figure 4:
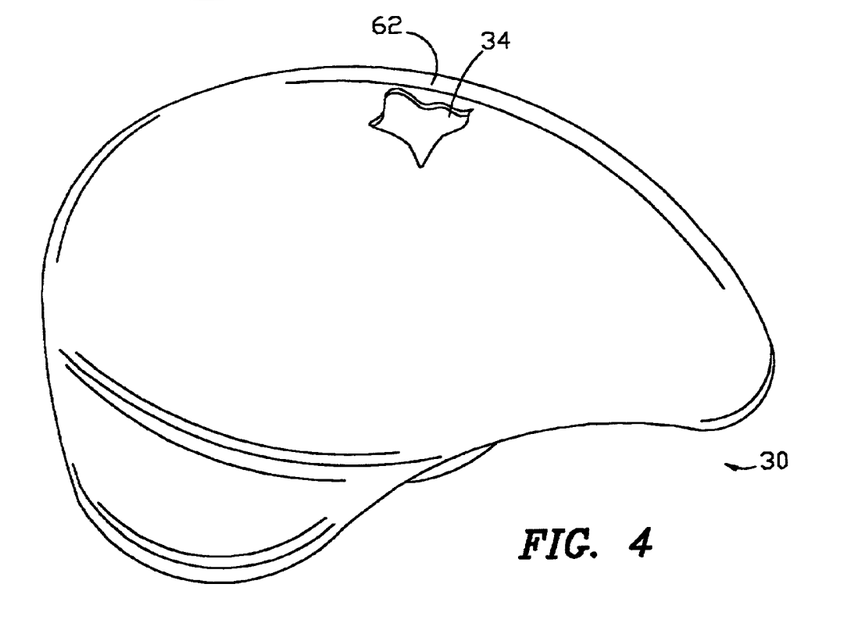
FIG. 4 is a perspective view of the helmet shown in FIG. 3 after a seed chemical has been applied to the helmet.
Figure 5:
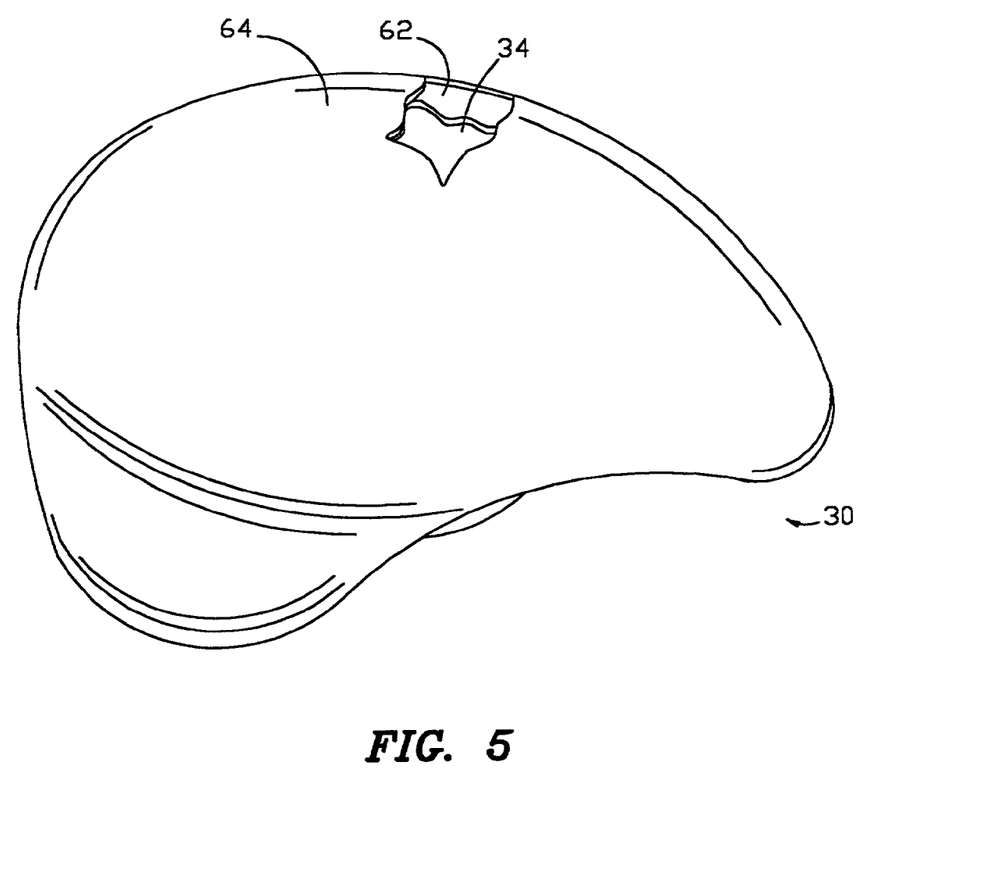
FIG. 5 is a perspective view of the helmet shown in FIG. 4 after a photosensitive material has been placed over the helmet.

Initially, a typical, commercially available, helmet 30 is provided as shown in FIG. 3. Next, a seed chemical 62 is applied to the exterior surface 34 of the helmet 32 as shown in FIG. 4. This application of a seed chemical 62 to the helmet 30 is in accordance with the known Amp-Azko method and should be well understood by one of ordinary skill in the art. Then, a photosensitive material 64 is placed over the helmet 30 as shown in FIG. 5. Next, paths 66 are exposed onto the photosensitive material 64 on the helmet 30 using the following method of exposing paths on a curved surface.

Figure 6:
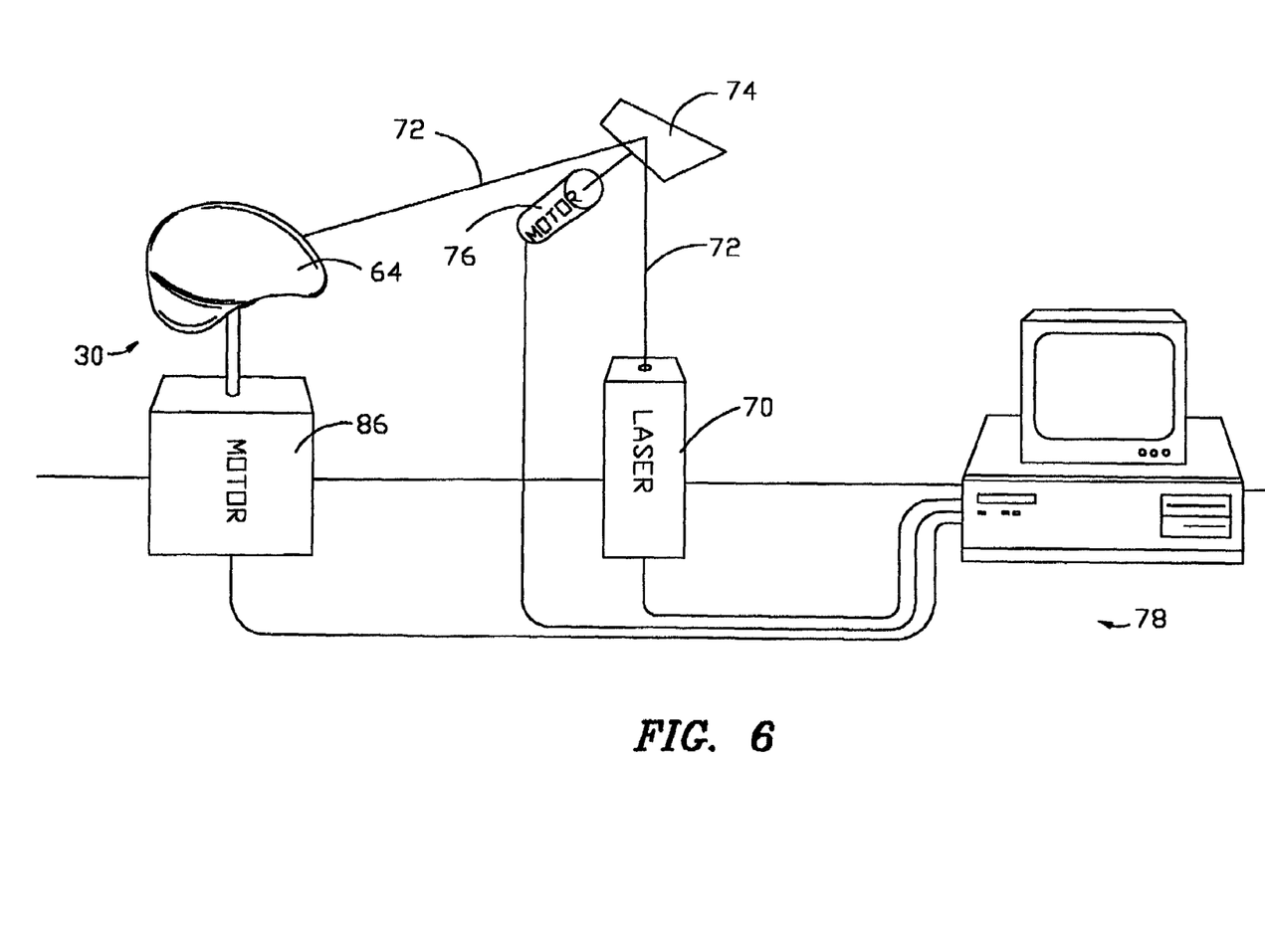
FIG. 6 is a plan view showing the practicing of a method of exposing paths on the helmet shown in FIG. 5.

First, the helmet 30 is placed under the directive control of a first stepper motor 68 as shown in FIG. 6, where the first stepper motor 68 is able to rotate the helmet 30 in a horizontal direction. A laser 70 is used to shine a laser beam 72 vertically at a mirror 74 which bends and reflects the laser beam 72 to the helmet 30. As shown in FIG. 6, the mirror 74 may be under the directive control of a second stepper motor 76, where the second stepper motor 76 is able to rotate the mirror 74 in a vertical direction. Both the first stepper motor 68 and the second stepper motor 76 are connected to, and in communication with, a computer 78. The laser 70 is also connected to, and in communication with, the computer 78.

Figure 7:
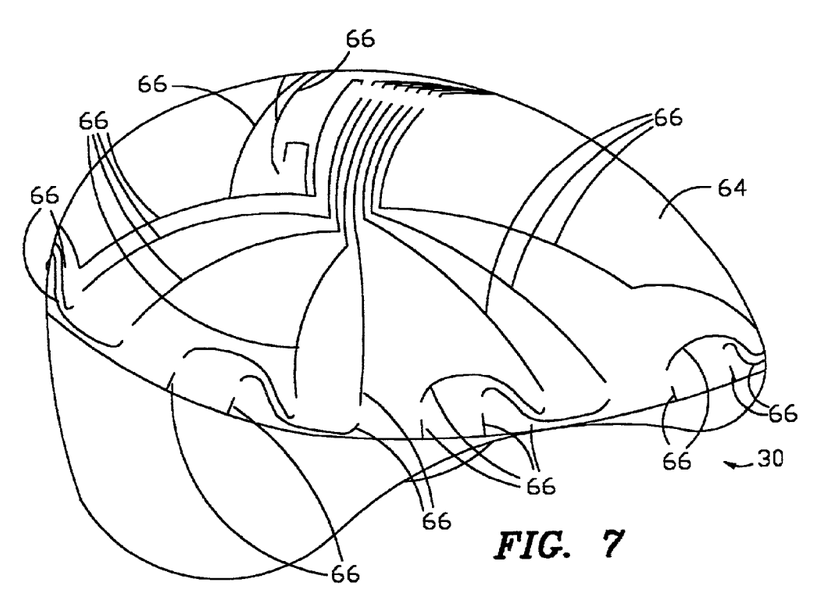
FIG. 7 is a perspective view of the helmet shown in FIG. 5 after paths have been exposed on the helmet.

The computer 78 is programmed such that the computer 78 simultaneously directs the first stepper motor 68 to rotate the helmet 30 horizontally and directs the second stepper motor 76 to rotate the mirror 74 vertically. By moving the helmet 30 in one degree of freedom and the mirror 74 in the other degree of freedom while aiming the laser beam 72 at the helmet 30, it is possible to aim the laser beam 72 to any point on the exterior surface 34 of the helmet 30. At the same time the stepper motors 68 and 76 are moving the helmet 30 and the mirror 74, respectively, the computer 78 turns the laser 70 on in order to expose the paths 66 on the helmet 30 as shown in FIG. 7, and turns the laser 70 off, by shuttering or by altering the electrical excitation of the laser beam 72, when the laser beam 72 must be moved to a different point on the helmet 30 without exposing a path 66. In this manner, all the necessary paths 66 as shown in FIG. 7 may be exposed including the grounding loop 42. The exposing of the paths can include, for example, using the laser beam according to this method for cutting, burning, or etching the desired paths.

In providing that the computer 78 effectively operate the first stepper motor 68, the second stepper motor 76, and the laser 70 to precisely expose the paths 66 shown in FIG. 7, the computer 78 may be pre-programmed to direct the first stepper motor 68, second stepper motor 76, and laser 70 to precisely trace and expose these paths 66, or the computer 78 may be supplied with software such that the mirror 74 and helmet 30 are first guided manually along the paths 66 to be exposed thus resulting in the computer 78 forming discrete data points, and thus "learning" the paths 66. The software then smooths out these discrete data points, and then the software can direct the computer 78 to operate the first stepper motor 68, the second stepper motor 76, and the laser 70 in order to smoothly and automatically trace out and expose the paths 66. Subsequently, there would be no need to manually guide the mirror 74 or helmet 30 again in order to expose the same paths 66 on an identically-shaped curved surface since the computer 76 would be able to repeat the same process as a result of what it has "learned" through the manual guiding of the mirror 74 and helmet 30.

Figure 8:
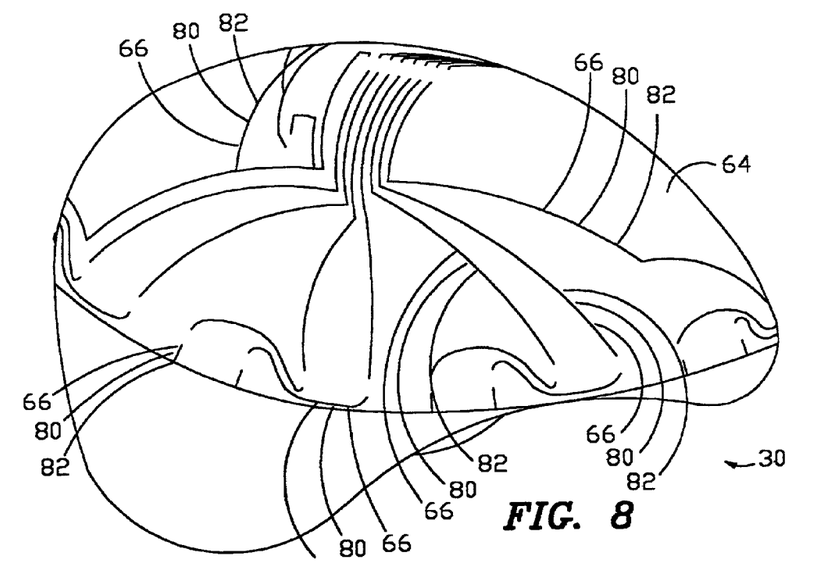
FIG. 8 is a perspective view of the helmet shown in FIG. 7 after conductive material has been placed along the paths.

Next, a conductive material 80, as shown in FIG. 8, is placed along the paths 66 exposed by the laser beam 72. This conductive material 80 may be placed along the paths 66 using electroless baths within the Amp-Akzo method as discussed above or by using some other method such as by sputtering conductive metal along the paths 66 under a vacuum. Preferably, the conductive material 80 comprises copper, but any material may be used so long as the material is adequately conductive. For example, the conductive material 80 may be comprised of silver which can be applied by using a conductive ink pen or conductive epoxy available through Allied Electronics, Inc. in Cedar Rapids, Iowa, or from Circuit Works in Kennesaw, Ga.

Then, a protective overcoat 82 is applied over the paths, and the protective overcoat 82 can be applied by using an overcoat pen also available through Allied Electronics, Inc. from Circuit Works. Alternatively, the protective overcoat can be applied using a clear coat sprayed over the helmet, and the clear coat can include an ultraviolet (UV) light filter. Finally, the resonator 44, battery 38, capacitor 40, resistor 56, first driver chip 46, second driver chip 48, microprocessing chip 36, light emitting diodes 50 and 52, and means for receiving a signal 54 are added to the helmet shown in FIG. 8, thus resulting in the helmet shown in FIGS. 1 and 2.

An anticipated alternative to the method described above is to either move the helmet in both degrees of freedom while keeping the mirror stationary, to move the mirror in both degrees of freedom while keeping the helmet stationary, or to move both the mirror and the helmet in both degrees of freedom.

Figure 9:
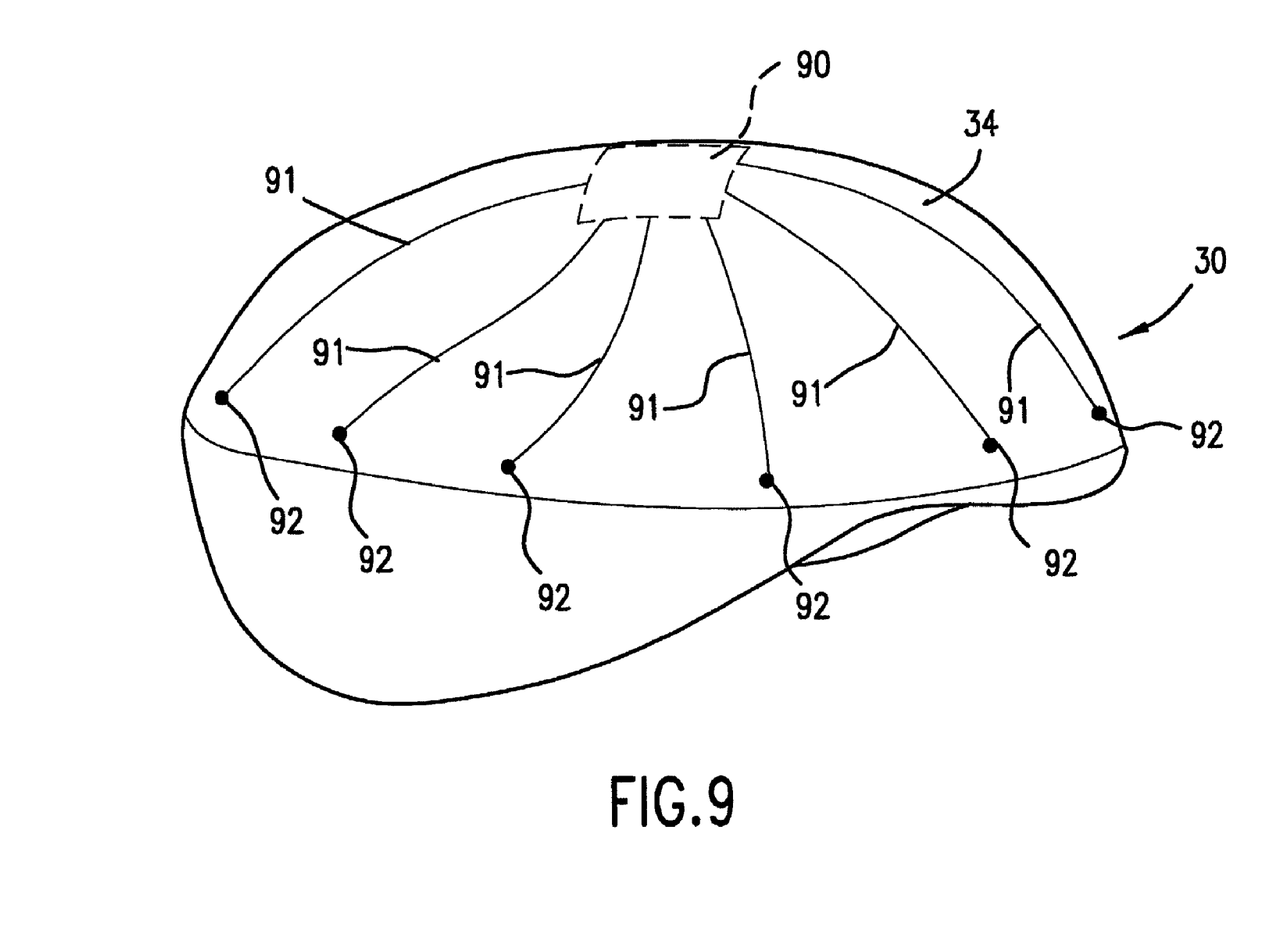
FIG. 9 is a perspective view of an alternative embodiment of a helmet using fiber optics or other light conductors in accordance with the present invention.

FIG. 9 is a perspective view of an alternative embodiment of helmet 30 using fiber optics in or other light conductors accordance with the present invention. This embodiment uses a fiber optic bundle including multiple fiber optic conductors 91 attached to exterior surface 34 of helmet 30. Fiber optic conductors 91 are optically coupled to a light source contained within a compartment 90, which can also contain logic circuitry for controlling the light source and a battery or other power source for powering the logic circuitry. In this example, the ends 92 of the fiber optic conductors are polished to create lenses. Ends 92 can alternatively contain separate lenses affixed to them. Any conventional fiber optic conductor or other type of light conductor can be used, and fiber optics are known in the art. If fiber optic conductors 91 are used with polished ends 92 for lenses, then fiber optic conductor should be of sufficient diameter to create a polished end for emitting light.

Figure 10:
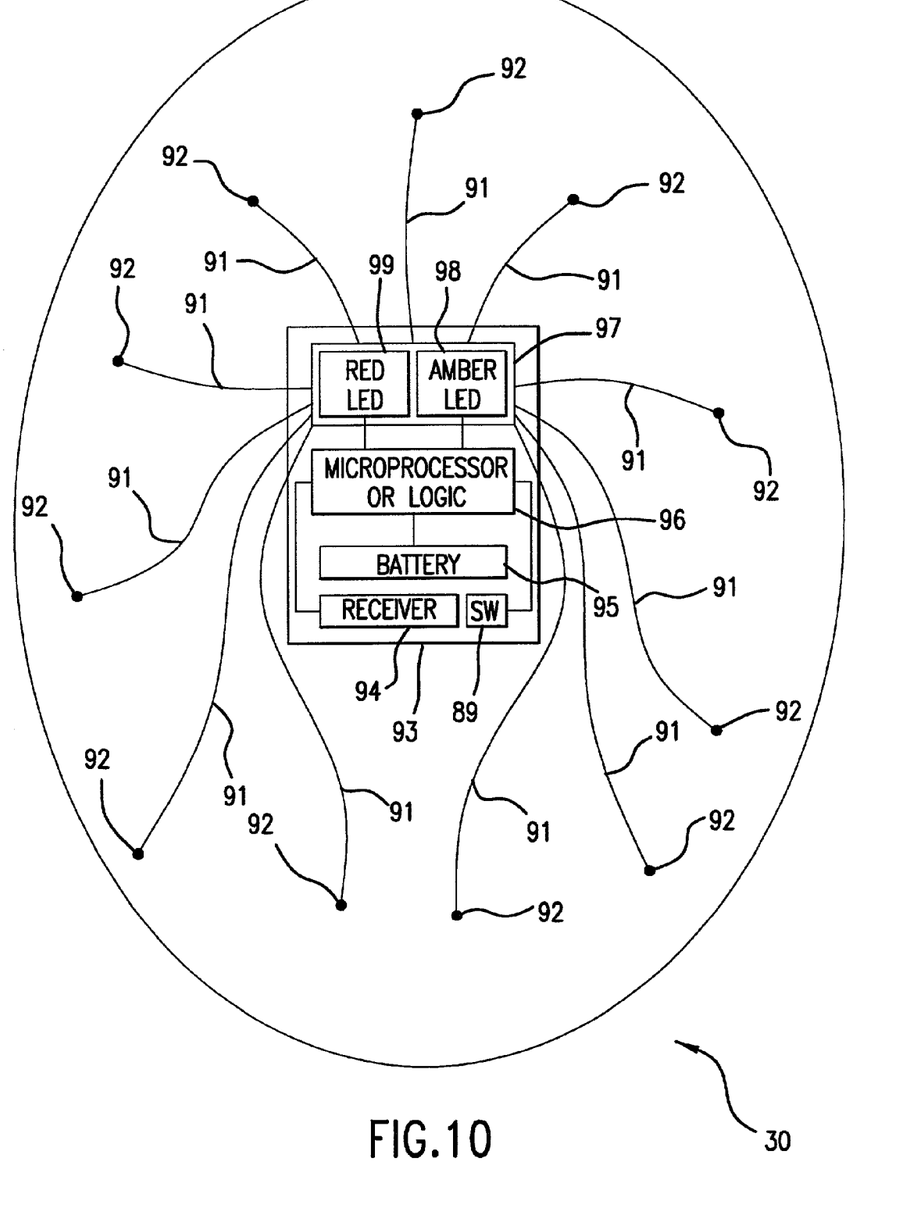
FIG. 10 is a top view of the helmet shown in FIG. 9 including a breakaway logic and light source compartment.

FIG. 10 is a top view of the helmet shown in FIG. 9 including a breakaway compartment 93 for containing circuit components. As shown in this example, the light source can be implemented with one or more super bright light emitting diodes (LEDs) 98 and 99. The LEDs are contained within a chamber 97, providing for optical coupling of the ends of fiber optic conductors 91 with LEDs 98 and 99. In particular, the chamber can contain the LED and be an opaque color to providing shielding from ambient light. The ends of fiber optic conductors 91 are attached to apertures in chamber 97 so that they are in proximity to the LEDs 98 and 99. The optical coupling requires that the ends of fiber optic conductors 91 be in sufficient proximity to transmit light from the LEDs or other light source; they need not necessarily be in physical contact with the LEDs or other light source.

As shown, chamber 97 can include one or more LEDs and in this example it includes an amber LED 98 and a red LED 99. Additional or different colored LEDs or other light sources can be used. Also, if three LEDs having the primary colors are used within the same chamber 97, then logic circuitry can be programmed or configured to selectively turn on the LEDs to combine their colors and generate a whole spectrum of color signals. The colors amber and red are useful in a safety light system, for example, in that amber color indicates a caution condition and red color indicates a warning condition.

Compartment 93 also includes a microprocessor or other logic 96 coupled to LEDs 98 and 99 for controlling their operation. A battery 95 is also contained within compartment 93 for providing power to the microprocessor or logic 96 and thus, in effect, also powering the light source. Compartment 93 can also include a power switch 89 for turning the microprocessor or other logic, and hence the lights, off and on. When the light system includes a microprocessor, it can have the same functions and operation as described above with respect to microprocessing chip 36, such as multiple programming sequences. For example, it can provide for steady lights, flashing lights, multiple colors or patterns, or various multiplexing of light signals to generate particular colors, patterns, or intensities. As an alternative to a microprocessor, the light system can include logic. For example, if the lights need only operate in illuminated and non-illuminated modes, the logic can include a switch for selectively providing power from battery 95 to the light source. The logic can also include additional circuitry for implementing other modes such as, for example, switches and circuit components to select between a constant illumination mode and a flashing illumination mode, or to select between amber and red colors. The term "logic circuitry" includes a microprocessor, hardwired logic, or a combination of them.

Compartment 93 can optionally contain a receiver 94 connected to the microprocessor or other logic 96. Receiver 94 can include the same function as the means for receiving a signal 54 described above. For example, it can be implemented with a receiver configured to receive an ultrasonic signal, an infrared signal, or a radio frequency signal for use by the microprocessor or other logic in controlling operation of the light source in response to actuation of a break or other input. Although shown in approximately the center of the helmet 30, the compartment 93 can be included anywhere within helmet 30 depending upon, for example, safety concerns, ease of connecting the components, or ease of manufacturing the helmet.

Compartment 93, when implemented as a breakaway compartment, can include a physical container or "box" removably attached to the helmet exterior surface or shell. It can include connectors for removably mounting it within the helmet. It can also include connectors permitting fiber optic conductors 91 to connect with compartment 93. A location of the breakaway compartment can be based upon weight distribution, helmet balance, or other factors. Alternatively, compartment 93 can include one or more apertures for passing fiber optic conductors 91 to chamber 97, which can include connectors for use in optically coupling fiber optic conductors 91 to the light source. The use of a breakaway compartment may enhance safety, for example, by containing the circuit components and permitting them to easily "break away" from the shell in the event of an accident.

Figure 11:
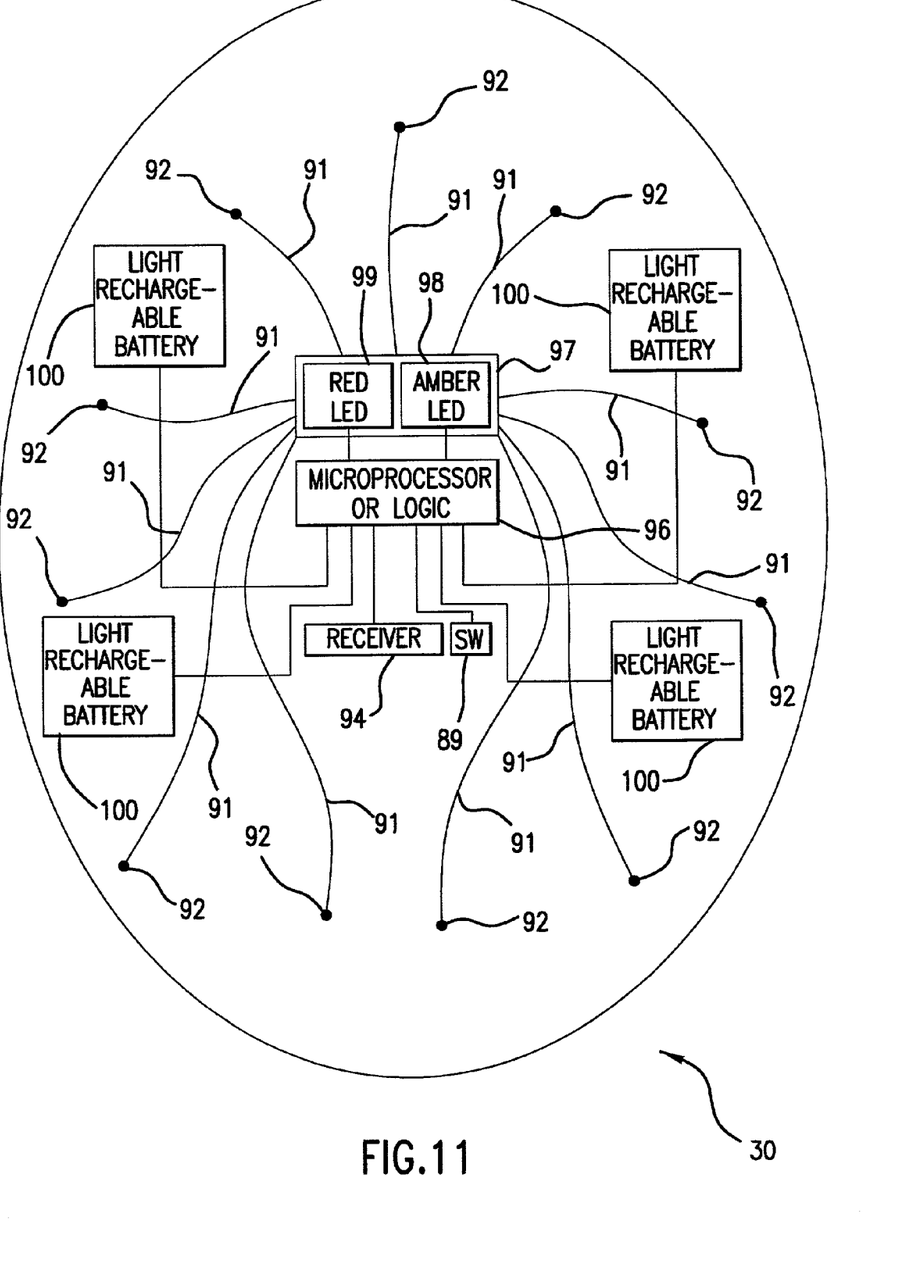
FIG. 11 is a top view of the helmet shown in FIG. 9 including the use of light rechargeable batteries.

FIG. 11 is a top view of the helmet shown in FIG. 9 including the use of light rechargeable batteries 100 and possibly without the breakaway compartment 93. One or more light rechargeable batteries 100 are positioned on the top exterior surface of helmet 30 for receiving light for recharging. Each battery 100 is coupled to the microprocessor or other logic 96 for providing power to it. An example of light rechargeable batteries includes the Panasonic manganese titanium rechargeable lithium batteries, which are approximately the size of a "nickel." Other types of rechargeable batteries can be used. For example, batteries can be rechargeable by connection to an external power source, either by removing them from the helmet for placement within a recharger or by connecting the helmet to the power source with the batteries kept in the helmet. Although four are shown, any number of rechargeable batteries can be used depending upon, for example, the power requirements of the microprocessor or other logic 76 and the light source. These batteries provide the advantage, for example, of permitting the batteries to recharge while the helmet is in use or even by leaving the helmet in the light when not in use.

The example in FIG. 11 is shown without breakaway compartment 93; however, it could include compartment 93 for containing light source chamber 97, microprocessor or other logic 96, receiver 94, and possibly batteries 100. Also, although shown in approximately the center of helmet 30, light source chamber 97, microprocessor or other logic 96, receiver 94, and possibly batteries 100 can be positioned at other locations in the helmet depending upon, for example, the factors listed above for compartment 93.

Figure 12:
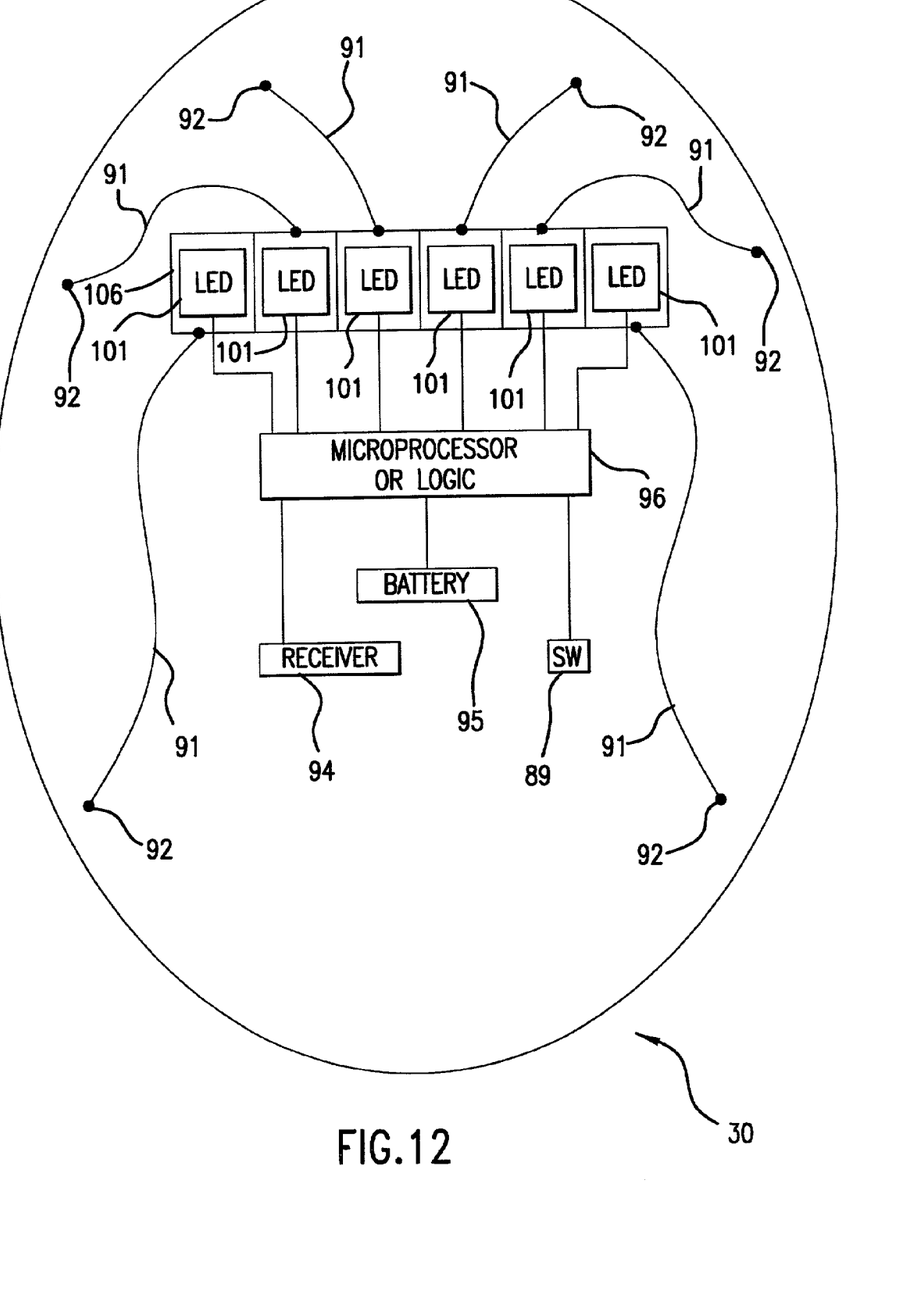
FIG. 12 is a top view of the helmet shown in FIG. 9 including individual light sources.

FIG. 12 is a top view of the helmet shown in FIG. 9 including individual light sources 101 in a multi-compartment chamber 106. In this example, each fiber optic conductor 91 includes its own light source, such as individual LEDs. Each LED can be contained within a separate chamber optically coupled to the end of a fiber optic conductor and shielded from ambient light and the LEDs. Alternatively, physically separate chambers or sets of chambers can be used for the optical coupling and shielding. The microprocessor or other logic 96 is also connected to each light source for individually controlling the light sources. The use of individual light sources can provide, for example, greater control and flexibility in the light signals emitted by ends 92 of the fiber optic conductors 91. This control can be particularly useful, for example, in generating patterns for display.

Figure 13:
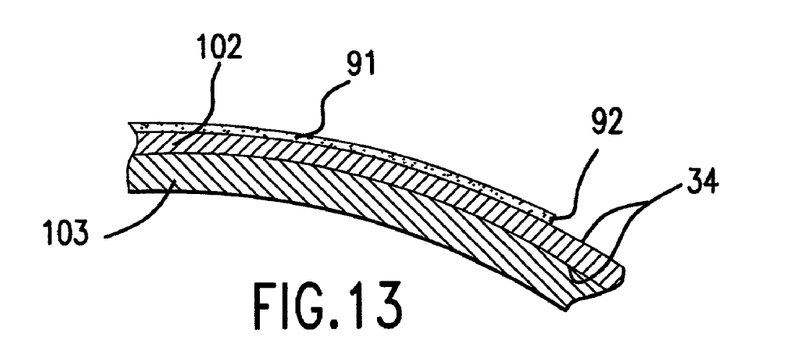
FIG. 13 is a side sectional view of a portion of the helmet shown in FIG. 9 illustrating adhering a fiber optic conductor to a first exterior surface of the helmet.
Figure 14:
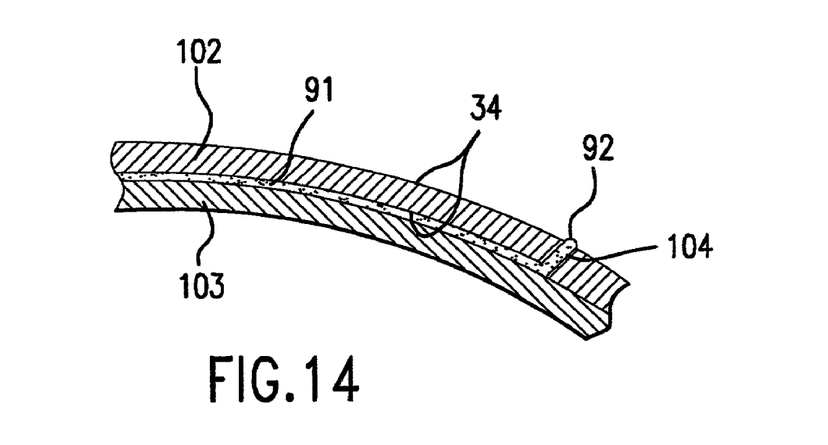
FIG. 14 is a side sectional view of a portion of the helmet shown in FIG. 9 illustrating adhering a fiber optic conductor to a second exterior surface of the helmet.
Figure 15:
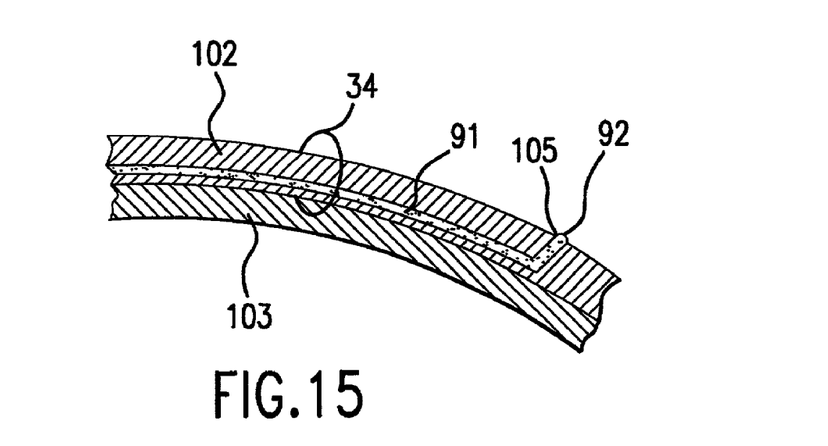
FIG. 15 is a side sectional view of a portion of the helmet shown in FIG. 9 illustrating in-molding of a fiber optic conductor in the exterior surface of the helmet.

FIGS. 13–15 are side sectional views of a portion of helmet 30 illustrating how the fiber optic conductors 91 can possibly be attached to the exterior surface 34 of helmet 30. A typical helmet includes a shell 102 such as a molded plastic material and a protective material 103 such as an extruded polystyrene (EPS) material. As shown in FIG. 13, fiber optic conductors 91 can be adhered to a top side of exterior surface 34 of shell 102, which can be accomplished using an adhesive for the attachment. A protective overcoat can optionally be placed over fiber optic conductors 91 after attachment of them.

As shown in FIG. 14, fiber optic conductors 91 can be adhered to an underside of exterior surface 34 of shell 102, between shell 102 and protective material 103. Shell 102 can include apertures 104 for allowing an end of the fiber optic conductors 91 to pass through to the top side of shell 102. Polished end 92 of the fiber optic conductor forms a lens on the top side of the exterior surface 34 of the shell 102.

Figure 16:
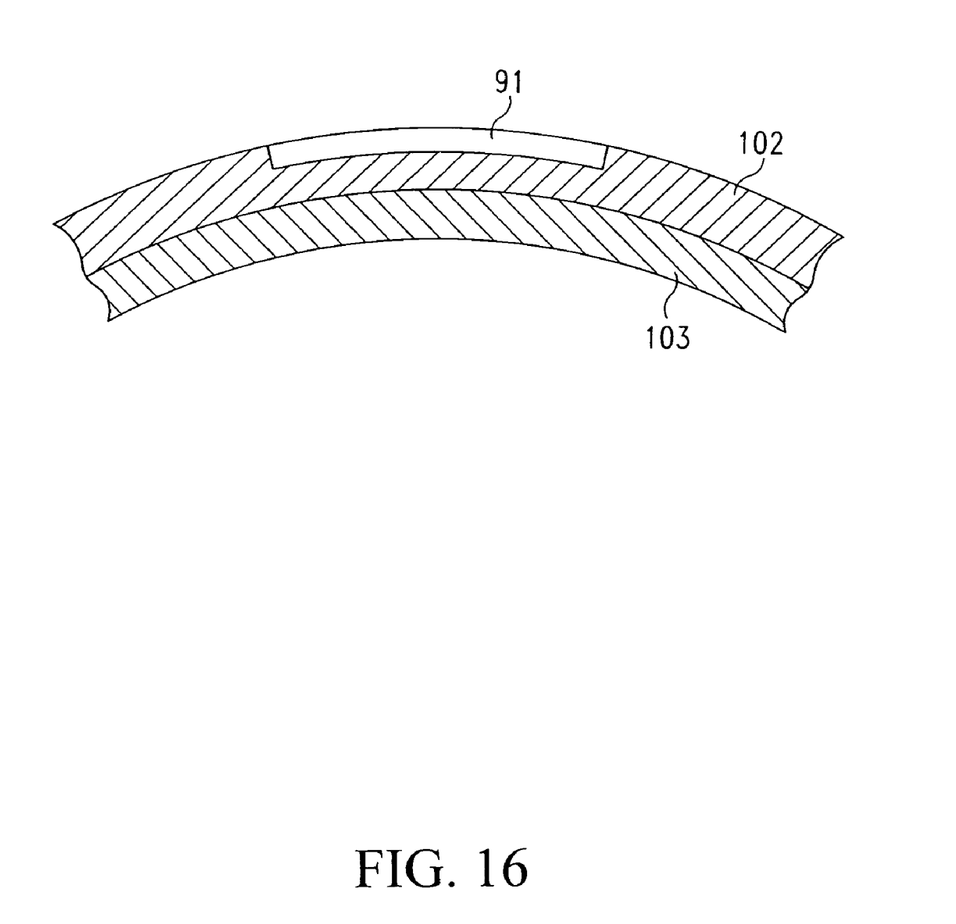
FIG. 16 is a side sectional view of a portion of the helmet shown in FIG. 9 illustrating in-molding of a fiber optic conductor in the exterior surface of the helmet.

As shown in FIG. 15 and 16, fiber optic conductors 91 can be molded within shell 102. For example, if shell 102 is implemented with a thermoplastic material, fiber optic conductors 91 can be in-molded during injection molding of the shell. The molding can include molding at least a portion of fiber optic conductors 91 completely within shell 102, making that portion hidden from view. Alternatively, the molding can include molding fiber optic conductors 91 into the top side or underside of exterior surface 34 of shell 102, providing for part of the in-molded portion of the fiber optic conductors to be visible. Therefore, "in-molding" includes completely in-molding or partially in-molding on either surface. Shell 102 can include apertures 105 for allowing an end of the in-molded fiber optic conductor 91 to pass through to the top side of shell 102. Polished end 92 of the fiber optic conductor forms a lens on the top side of exterior surface 34 of shell 102.

For any of the techniques shown in FIGS. 13–15, the fiber optic conductors preferably become integral with exterior surface 34 by being permanently formed within and non-affixed to it. The use of an adhesive for attachment or in-molding of the fiber optic conductors can make at least a portion of the fiber optic conductors integrated in the exterior surface of the helmet, which may provide for greater durability. Attachment of the fiber optic conductors can include permanent adhering or in-molding to make a portion of them integral with the surface, or non-integral attachment of the fiber optic conductors on or within the surface.

If fiber optic conductors 91 are attached to or molded into the top side of the exterior surface, the light passing through the fiber optic conductors can be viewed. Therefore, the fiber optic conductors can be attached to or molded into the top side in a particular pattern or way in order to create and show light patterns for vanity or other purposes. Also, for the any of the embodiments using fiber optic conductors 91, the conductors can be attached or molded into the exterior surface in any way and the patterns in FIGS. 9–12 are shown for illustrative purposes only. The fiber optic bundles can also be sheathed for blocking transmission of light or non-sheathed for permitting transmission of light. For example, sheathed bundles can be used when attaching the fiber optic conductors to the surface of the helmet and when desiring that only the ends emit light, and non-sheathed bundles can be used when desiring that patterns be visible for display.

In addition, the helmet or other curved surface can optionally include photonic crystal slabs as junction blocks joining two fiber optic conductors. The photonic crystal slab can turn light between the connected fiber optic conductors at an angle that may be too severe for the rigidity of the fiber optic conductor. In other words, if the fiber optic conductor is too rigid to bend at a desired angle on the helmet or other curved surface, the photonic crystal slab can join two fiber optic conductors at the desired angle and transport a light signal between them. An example of a photonic crystal slab is described in, for example, the following text, which is incorporated herein by reference: Edmond Chow et al., "Three-dimensional control of light in a two-dimensional photonic crystal slab," Nature, Vol. 407, pp. 983–88 (Oct. 26, 2000).

As an alternative, helmet 30 can include both fiber optic conductors and metal pathways for use as electrical conductors or antennas. In particular, after fiber optic conductors 91 are molded into the exterior surface or shell of the helmet, the shell can then be remolded with seed chemicals and the other techniques, described above and in the related application identified above, to create paths in the surface and lay metal conductive material into the paths.

The foregoing description and drawings merely explain and illustrate the invention. The invention is not limited thereto, as those skilled in the art who have a disclosure before them will be able to make modifications and variations therein without departing from the scope of the invention. For example, it is anticipated to be within the scope of the invention that the helmet may be of a shape different than that depicted herein, or that conductive paths be provided on curved surfaces other than on a helmet to be worn on the head while riding a bicycle or motorcycle, or for other purposes.

What is claimed is:

1. A light system on a helmet having an exposed exterior surface, the light system comprising:
   at least one light source; and
   at least one light conductive path permanently formed within and non-affixed on the exposed exterior surface of the helmet, the path having a first end optically coupled to the light source and a second end for emitting light.

2. The light system of claim 1 wherein the light conductive path is permanently adhered to the exterior surface.

3. The light system of claim 1 wherein at least a portion of the light conductive path is in-molded with the exterior surface.

4. The light system of claim 1 wherein the light conductive path comprises a fiber optic conductor and wherein the second end of the fiber optic conductor is polished to create a lens for emitting the light.

5. The light system of claim 1 wherein the light source comprises a light emitting diode.

6. The light system of claim 5 wherein the light source comprises a plurality of light emitting diodes of different colors.

7. The light system of claim 1, further comprising a protective overcoat over the light conductive path.

8. The light system of claim 1, further comprising logic circuitry connected to the light source for controlling light emitted by the light source.

9. The light system of claim 8, further comprising a receiver for receiving a signal, and wherein the logic circuitry controls the light source as a result of receiving the signal.

10. The light system of claim 9 wherein the receiver is capable of receiving at least one of the following types of signals: an ultrasonic signal; an infrared signal; or a radio frequency signal.

11. The light system of claim 8 wherein the logic circuitry is programmed to permit selection between multiple programming sequences.

12. The light system of claim 8, further including a battery connected to the logic circuitry.

13. The light system of claim 12 wherein the exterior surface includes a removable compartment for containing the light source, the logic circuitry, and the battery.

14. The light system of claim 12 wherein the battery comprises a rechargeable battery.

15. A light system on a helmet, comprising:
   a shell having an exposed exterior surface;
   at least one light source;
   a plurality of fiber optic conductors permanently formed within and non-affixed on the exterior surface of the shell, the fiber optic conductors each having a first end optically coupled to the light source and having a second end for emitting light;
   a power source; and
   logic circuitry coupled to the light source and the power source for controlling operation of the light source, wherein the light source, the power source, and the logic are located on the shell.

16. The light system of claim 15 wherein at least a portion of the fiber optic conductors are at least partially in-molded with the shell.

* * * * *